(12) United States Patent
Komatsu et al.

(10) Patent No.: US 7,760,586 B2
(45) Date of Patent: Jul. 20, 2010

(54) BOTTOM-SEDIMENT CLASSIFICATION DEVICE AND METHOD

(75) Inventors: Teruhisa Komatsu, Tokyo (JP); Akira Okunishi, Nishinomiya (JP); Nicolas Borrallo, Nishinomiya (JP); Takeharu Yamaguchi, Nishinomiya (JP)

(73) Assignees: The University of Tokyo, Tokyo (JP); Furuno Electric Company Limited, Nishinomiya (JP)

( * ) Notice: Subject to any disclaimer, the term of this patent is extended or adjusted under 35 U.S.C. 154(b) by 87 days.

(21) Appl. No.: 12/150,578

(22) Filed: Apr. 28, 2008

(65) Prior Publication Data
US 2009/0122642 A1 May 14, 2009

(30) Foreign Application Priority Data
Apr. 26, 2007 (JP) .............................. 2007-116299

(51) Int. Cl.
*G01S 15/00* (2006.01)
*G01V 1/00* (2006.01)

(52) U.S. Cl. ......................................... 367/88; 367/21

(58) Field of Classification Search ................... 367/21, 367/38, 88, 97
See application file for complete search history.

(56) References Cited

U.S. PATENT DOCUMENTS 3,924,258 A * 12/1975 Fowler ........................ 367/108
5,671,136 A * 9/1997 Willhoit, Jr. ................. 702/18
6,553,315 B2 * 4/2003 Kerekes et al. ................ 702/14
6,801,474 B2 * 10/2004 Preston ......................... 367/97

FOREIGN PATENT DOCUMENTS

| EA | 0 501 743 B1 | 10/1997 |
| JP | 3088557 | 7/2000 |
| JP | 3450661 | 7/2003 |
| JP | 2007-178125 | 7/2007 |

OTHER PUBLICATIONS

Chakraborty, et al., "Acoustic Seafloor Sediment Classification Using Self-Organizing Feature Maps," IEEE Transactions on Geoscience, 39:2722-2725 (2001).
Dung, et al., "Sea Bottom Recognition Using Multistage Fuzzy Neural Network Operating on Multi-Frequency Data," Acustica acta acustica, 86:830-837 (2000).

* cited by examiner

*Primary Examiner*—Jack Keith
*Assistant Examiner*—Krystine Breier
(74) *Attorney, Agent, or Firm*—Nutter McClennen & Fish LLP; John J. Penny, Jr.

(57) ABSTRACT

A device and method for determining bottom sediment is provided. The method includes transmitting a pulse of a pulse width corresponding to a water-bottom depth, extracting a series of amplitude data of water-bottom echo signals from predetermined signals among the water-bottom echo signals received by the transducer at a predetermined time interval, normalizing the extracted series of amplitude data after TVG-processed, calculating two or more feature quantities based on the normalized series of amplitude data in each of segments of the normalized series of amplitude data, and a value corresponding to the water-bottom depth, and generating bottom-sediment classification information indicating the bottom sediment based on the two or more feature quantities.

16 Claims, 7 Drawing Sheets

BOTTOM-SEDIMENT CLASSIFICATION DEVICE AND METHOD

CROSS-REFERENCE TO RELATED APPLICATION(S)

This application claims priority under 35 U.S.C. §119 to Japanese Patent Application No. 2007-116299, which is filed on Apr. 26, 2007, the entire disclosure of which is hereby incorporated by reference.

TECHNICAL FIELD

The present invention relates to a bottom-sediment classification device and method for determining water bottom sediment.

BACKGROUND

Conventionally, a fish finder that displays shoal-of-fish information detected using an ultrasonic wave on a display, while displaying information on water bottom sediment (i.e., rocks, stones, sands, mud, etc.), is known. The fish finder transmits a pulse of the ultrasonic wave towards water bottom from the transducer, and analyzes a water-bottom echo of the transmission pulse to obtain the bottom sediment information. The information is often used to know habitats of bottom fish, shrimps, crabs, and rocks causing breakage of a fishnet, etc. The bottom sediment is also detected using a sonic depth finder, as a part of oceanographic investigations.

When water bottom has many rocks and stones, and the water bottom surface is rough, because a water-bottom echo reflected from relatively a wide area around a water bottom position directly below the transducer is received by the fish finder, a time length of water-bottom echoes will be longer. On the other hand, when the water bottom surface is covered with sand or mud and is flat, because the reflected water-bottom echo can be received only from a narrow area, the echo length will be shorter. Further, as the water-bottom depth is deeper, the water-bottom echo length will be longer.

Japanese Patent No. 3,088,557 and No. 3,450,661 disclose a method of determining bottom sediment. This method first obtains a time length while water-bottom echoes exceed a predetermined threshold level, and a time after a pulse is transmitted until the water-bottom echoes are received. The method then divides the time length by the time to determine the bottom sediment.

Further, in European Patent No. 0501 743, a method of determining bottom sediment based on a received signal of a sonic depth finder, as shown in FIG. 6 is disclosed. In FIG. 6, reference numeral 61 indicates a signal that is the transmission pulse directly received, 62 indicates a primary water-bottom echo, 62a indicates a leading portion of the primary water-bottom echo, 62b indicates a tail portion of the primary water-bottom echo, and 63 indicates a secondary water-bottom echo. The secondary water-bottom echo is a reflection from the water bottom after the primary water-bottom echo reflects in a water surface or a ship's bottom. European Patent No. 0501 743 discloses that an integrated value of the tail portion 62b can be used as an index of roughness (coarseness of water bottom surface), that an integrated value of the entire range of the secondary water-bottom echo 63 is an index of hardness (hardness of the water bottom surface), and that the bottom sediment can be determined based on these integrated values.

Although the integrated value of the tail portion 62b is an index of the roughness, it is also influenced by the hardness of the water bottom surface. Japanese Unexamined Patent Application Publication No. 2007-178125, which filed by the present assignee, discloses a method of reducing the above influence by normalizing the signal of the tail portion 62b with its maximum value.

U.S. Pat. No. 6,801,474 discloses a method in which a pulse with a constant pulse width is transmitted, and amplitude data of water-bottom echo signals, which is sampled at a predetermined interval, is re-sampled at a frequency defined by a function of a water-bottom depth and a transmitting pulse width. The re-sampled amplitude data is collected at all research locations of a target ocean area, and feature vectors of water-bottom echoes at each research location is calculated from the collected amplitude data, where the feature vector represents characteristics of a shape and a width of the water-bottom echo, which is constituted with many elements more than 100. Then, three main components by which each element of the feature vector is linearly combined are calculated for each research location by a principal-component analysis, to classify the bottom sediment at each research location into classes of 5 to 10 based on values of the three main components. Coefficient used for the linear combination is calculated from the feature vectors at all the research locations.

Further, ACUSTICA acta acustica, (the Federal Republic of Germany), 2000, Vol. 86, p. 830-837, and "IEEE TRANSACTIONS ON GEOSCIENCE AND REMOTE SENSING" (U.S.), December 2001, Vol. 39, No. 12, p. 2722-2725 disclose a method using a neural network for the bottom-sediment classification.

Assuming a water-bottom depth is D, an half angle of a directivity angle of a ultrasonic wave transmitted from and received by a fish finder is $\theta$, a transmitting pulse width is $\tau$, a speed of sound in the water is c, and a water-bottom echo length is W, the length W is expressed by the following equation:

$$W = 2D(1/\cos\theta - 1)c + \tau \qquad (1)$$

As seen from the equation, the water-bottom echo length W depends on the water-bottom depth D as well as the transmitting pulse width $\tau$. However, because this is not taken into consideration in Japanese Patent No. 3,088,557 and No. 3,450,661 and European Patent No. 0501 743, an accuracy of bottom-sediment classification degrades for shallow water where influence of $\tau$ is large.

In U.S. Pat. No. 6,801,474, a pulse with a constant pulse width is transmitted regardless of the water-bottom depth. Disadvantages caused by this will be explained referring to FIG. 7A. Here, assuming a half angle of a directivity angle of the ultrasonic wave transmitted from the transducer is $\theta$. Further, assuming a water bottom position directly below the transducer when the water-bottom depth is D is P1, and a water bottom position pointed by the directivity angle is P2. Further, assuming a water bottom position directly below the transducer when the water-bottom depth is 2 D is P3, and a water bottom position pointed by the directivity angle is P4. For simplicity, an influence of propagation loss in the water is ignored, and the water-bottom echo signals from P1, P2, P3, and P4 will be considered. Here, as shown in FIG. 7B, assuming a time difference between water-bottom echo signals E11 and E12 from the water bottom positions P1 and P2, respectively, is T, a time difference between water-bottom echo signals E13 and E14 from the water bottom positions P3 and P4, respectively, will be 2 T. A width of the water-bottom echo signals E11-E14 is $\tau$. Thus, between a combined signal G11 of the water-bottom echo signals E11 and E12, and a combined signal G12 of the water-bottom echo signals E13 and E14, a geometric similarity of signal waveforms will be spoiled even if the water bottom sediment is the same.

The method disclosed in U.S. Pat. No. 6,801,474 samples the amplitude data of the water-bottom echo signals at the predetermined interval, and then re-samples the amplitude data at the frequency defined by the function of the water-bottom depth and the transmitting pulse width. Thus, the numbers of data of the amplitude data F11 and F12 after the re-sampling become equal even if the water-bottom depths differ. However, because the geometric similarity of waveforms for the combined signals G11 and G12 could be spoiled, the feature vectors calculated from the amplitude data F11 and F12 after the re-sampling will differ from each other. Thus, there is a problem that the classification results of the bottom sediments at research locations are dependent on the water-bottom depth.

Further, because the method disclosed in U.S. Pat. No. 6,801,474 classifies after all the amplitude data of the water-bottom echo of all the research locations are collected, it is not suitable for use in the fish finder, which requires a real-time bottom-sediment classification. Further, because the method merely performs the classification, but it does not determine the bottom sediment at the research locations, there is another problem that the bottom sediment must actually be checked, such as with an underwater camera, at representative research locations for each class.

SUMMARY

The present invention addresses the issues, and provides an improved bottom-sediment classification device and method.

According to one aspect of the invention, a bottom-sediment classification device is provided. The device transmits a pulse of an ultrasonic wave from a transducer to a water bottom, and determines bottom sediment of the water bottom based on water-bottom echo signals received by the transducer. The device includes a transmitting module for transmitting the pulse of a pulse width corresponding to a water-bottom depth, an extracting module for extracting a series of amplitude data of the water-bottom echo signals from predetermined echo signals among the received water-bottom echo signals at a predetermined time interval, a normalizing module for normalizing the series of amplitude data extracted by the extracting module, the extracted amplitude data being TVG-processed before the normalization, a feature quantity calculating module for calculating two or more feature quantities based on the normalized series of amplitude data in each of segments of the normalized series of amplitude data, and a value corresponding to the water-bottom depth, and a generating module for generating bottom-sediment classification information indicating the bottom sediment based on the two or more feature quantities.

The extracting module may calculate the two or more feature quantities by extracting the series of amplitude data at a time interval that is proportional to the water-bottom depth.

The feature quantity-calculating module may obtain the two or more feature quantities from the series of amplitude data in each of the segments using a value that is proportional to the water-bottom depth.

The predetermined the water-bottom echo signal may include primary water-bottom echo signals and secondary water-bottom echo signals.

The feature quantity-calculating module may calculate the two or more feature quantities by subtracting a threshold value from amplitude data that is greater than the threshold value among the series of amplitude data in each of the segments.

The transmitting module may transmit a first pulse and a second pulse of different frequencies or directivities. The feature quantity-calculating module may calculate the two or more feature quantities for the first and second pulses, respectively. The generating module may generate the bottom-sediment classification information based on the two or more feature quantities for the first and second pulses.

The generating module may generate the bottom-sediment classification information based on the two or more feature quantities calculated from the water-bottom echo signals using reference information. The reference information may be obtained from the two or more feature quantities calculated from the water-bottom echo signals from a water bottom of each bottom-sediment type, a bottom-sediment type of which is known, and the known bottom-sediment type.

The reference information may be obtained from the water-bottom echo signals in a shallow-water area and a deep-water area for each bottom-sediment type. The generating module may generate the bottom-sediment classification information selectively using one of the reference information for the shallow-water area or the deep-water area corresponding to the water-bottom depth.

The bottom-sediment classification information may include numerical values indicating similarities between the bottom sediment to be determined and two or more known bottom-sediment types, information indicative of a ratio of each of the numerical values over a sum-totaled value of all the numerical values being displayed.

The pulse to be transmitted may be a frequency modulation signal or a phase modulation signal.

Instead of the transmitting module transmitting the pulse of the pulse width corresponding to the water-bottom depth, the transmitting module may transmit a pulse of a frequency modulation signal or a phase modulation signal having a bandwidth that is inversely proportional to the water-bottom depth. A matched filter adapted to the pulse may be applied to the water-bottom echo signals received by the transducer.

According to another aspect of the invention, a bottom-sediment classification method is provided. The method includes transmitting a pulse of an ultrasonic wave from a transducer to a water bottom, and determining bottom sediment of the water bottom based on water-bottom echo signals received by the transducer. The method further includes transmitting the pulse of a pulse width corresponding to a water-bottom depth, extracting a series of amplitude data of the water-bottom echo signals from predetermined echo signals among the water-bottom echo signals received by the transducer at a predetermined time interval, normalizing the extracted series of amplitude data after TVG-processed, calculating two or more feature quantities based on the normalized series of amplitude data in each of segments of the normalized series of amplitude data, and a value corresponding to the water-bottom depth, and generating bottom-sediment classification information indicating the bottom sediment based on the two or more feature quantities.

According to still another aspect of the invention, a bottom-sediment classification device is provided. The device transmits a pulse of an ultrasonic wave from a transducer to a water bottom, and determines bottom sediment of the water bottom based on water-bottom echo signals received by the transducer. The device includes an extracting module for extracting a series of amplitude data of primary water-bottom echo signals and secondary water-bottom echo signals at a predetermined time interval from predetermined echo signals containing a peak of the primary water-bottom echo signals and a peak of the secondary water-bottom echo signals, respectively, a normalizing module for normalizing the extracted series of amplitude data after TVG-processed, an feature quantity calculating module for calculating two or more feature quantities of the primary water-bottom echo signals and two or more feature quantities of the secondary water-bottom echo signals based on the normalized series of amplitude data in each of segments of the normalized series of amplitude data, and a generating module for generating bottom-sediment classification information indicating the bottom sediment based on the two or more feature quantities.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION OF THE PREFERRED EMBODIMENT

Hereinafter, an embodiment of the present invention will be explained in detail with reference to the appended drawings.

Figure 1:
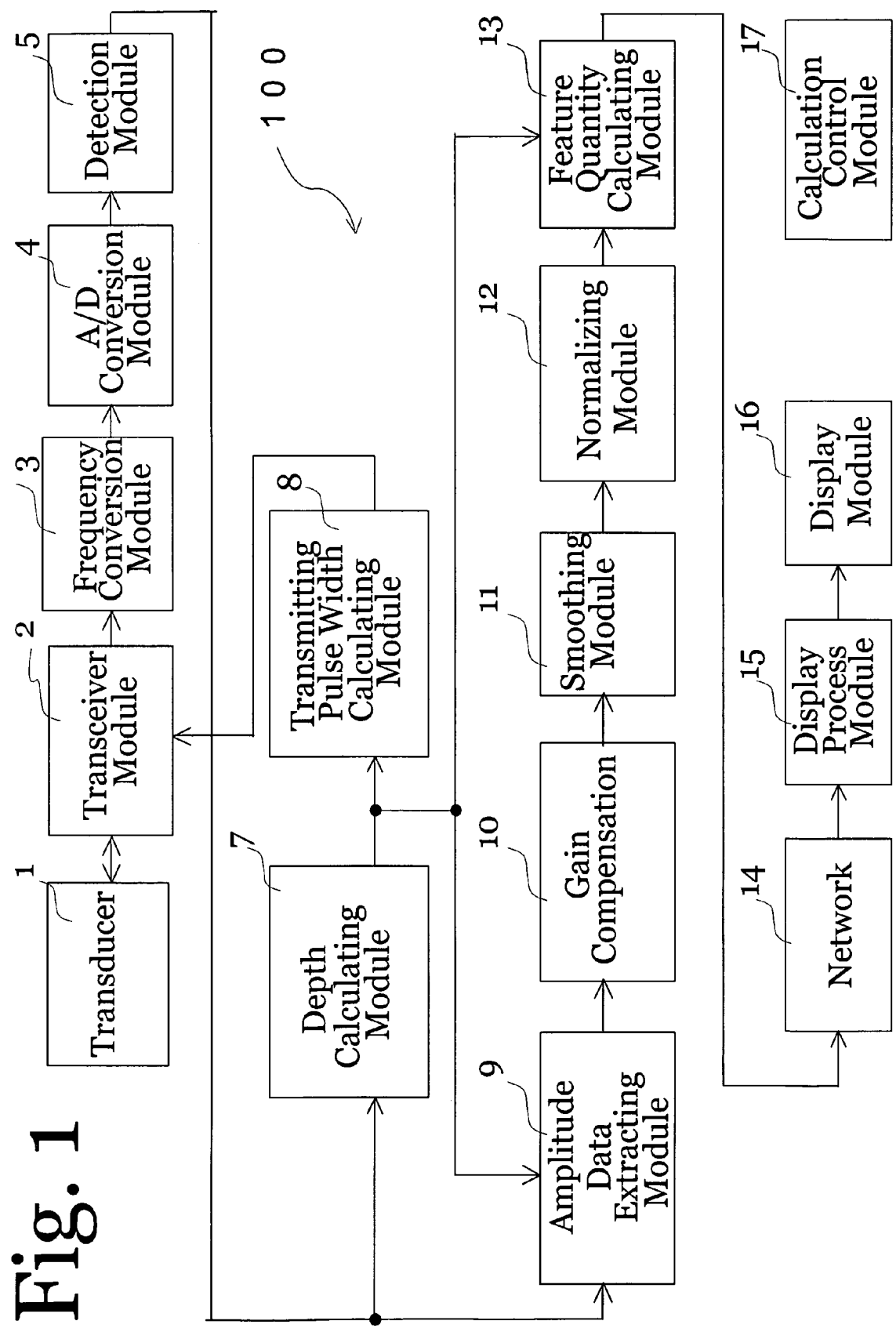
FIG. 1 is a block diagram showing a configuration of a bottom-sediment classification device according to an embodiment of the invention.

In FIG. 1, a bottom-sediment classification device 100 is illustrated. The classification device 100 has a function to detect a shoal of fish, as well as a function to determine water bottom sediment. Because the device 100 of this embodiment may utilize the conventional function to detect the shoal of fish, an explanation of the function will be omitted herein.

A transducer 1 transmits an ultrasonic pulse of two different frequencies (e.g., 50 kHz and 200 kHz) to a water bottom, and receives echoes reflected from the water bottom. A transceiver module 2 provides a transmission drive signal to the transducer 1 to operate, and performs band restriction and signal amplification to the received signal that is originated from the transducer 1. A frequency conversion module 3 converts the received signal of 50 kHz or 200 kHz into an intermediate frequency signal. A/D conversion module 4 converts the intermediate frequency signal of analogue signal into a digital signal. A detection module 5 detects the digital signal outputted from the A/D conversion module 4, and outputs its amplitude data.

A depth-calculating module 7 calculates a water-bottom depth from the amplitude data outputted from the detection module 5. A transmitting pulse width-calculating module 8 calculates a transmitting pulse width that is proportional to the water-bottom depth, and transmits a transmitting pulse width control signal according to the calculated value back to the transceiver module 2.

An amplitude data-extracting module 9 extracts amplitude data to be used for a bottom-sediment classification of this embodiment based on the amplitude data from the detection module 5 at a time interval that is proportional to the water-bottom depth. A gain compensation module 10 performs a Time Variable Gain (TVG) process to the extracted amplitude data.

A smoothing module 11 smoothes the TVG-processed or gain-compensated amplitude data. A normalizing module 12 normalizes the smoothed amplitude data at their maximum values. A feature quantity-calculating module 13 calculates a feature quantity from the normalized amplitude data.

A neural network 14 generates bottom-sediment classification information based on the feature quantity. A display process module 15 converts the bottom-sediment classification information into data for display, and displays it on a display module 16. Alternatively, the display data may be displayed on a separate monitor, such as a display screen of a personal computer outside the classification device 100.

A calculation control module 17 includes a CPU (not shown) and a storage device (not shown), such as a program memory, a buffer memory, and/or other memories, etc. The CPU executes a computer program typically stored in the program memory to perform various calculations and controls. The storage device stores any data, such as the amplitude data, the feature quantity, and the like to be used for this device.

In this embodiment, any one of or all of the modules, such as the depth calculating module 7, amplitude data extracting module 9, feature quantity calculating module 13, neural network 14 may also be realized by software.

Next, a principle operation of the classification device 100 will be explained. The water-bottom depth is not known immediately after the classification device 100 is actuated. Thus, the classification device 100 first transmits an ultrasonic pulse with a predetermined pulse width (e.g., 1 ms) from the transducer 1 to a water bottom, and then calculates the water-bottom depth based on a signal received by the transducer 1, according to a known method. The classification device 100 then determines another pulse width for the next pulse based on the calculated water-bottom depth, as explained below.

Next, the classification device 100 transmits a 50 kHz pulse with the calculated pulse width that is proportional to the water-bottom depth. Then, the classification device 100 calculates a water-bottom depth and a feature quantity based on the signal received by the transducer 1. Similarly, the classification device 100 transmits a pulse with a pulse width of 200 kHz that is proportional to the water-bottom depth, and then calculates a water-bottom depth and a feature quantity based on the signal received by the transducer 1. Then, the classification device 100 generates bottom-sediment classification information based on the feature quantity obtained by these two transmissions and receptions, and then displays the information on the display module 16. In this embodiment, the pulse transmissions of 50 kHz and 200 kHz and the display of the bottom-sediment classification information are repeated (hereinafter, this cycle is referred to as a "process cycle").

Next, a specific operation of the classification device 100 will be explained. The transceiver module 2 supplies a transmission drive signal of a pulse width according to the transmitting pulse width control signal inputted from the transmitting pulse width-calculating module 8 to the transducer 1. As a result, the transducer 1 transmits a pulse of an ultrasonic wave (50 kHz or 200 kHz) therefrom to a water bottom. When the transmitting pulse width is 1 ms and the transmitted frequency is 50 kHz, the transmitted pulse is a sine wave signal for 50 cycles.

The pulse transmitted from the transducer 1 is reflected from the water bottom, and a signal including a water-bottom echo is received by the transducer 1. The transceiver module 2 performs the band restriction and the signal amplification to the received signal, and then, the frequency conversion module 3 converts the band-restricted and amplified signal into an intermediate frequency signal. The frequency conversion is capable of communalizing the signal processes after the signal of two frequencies are received and performed the band restriction into one process.

Then, the A/D conversion module 4 converts the analogue intermediate frequency signal into a digital signal. Further, the detection module 5 detects the digital signal, and then, it outputs amplitude data. The amplitude data is then stored in the storage device of the calculation control module 17 to be read out for the operation of the depth-calculating module 7, the amplitude data-extracting module 9, etc.

The depth-calculating module 7 calculates the water-bottom depth using a conventional method, described above. The transmitting pulse width calculating module 8 then calculates a transmitting pulse width that is proportional to the water-bottom depth, based on the calculated water-bottom depth, and it then transmits a transmitting pulse width control signal according to the calculated transmitting pulse width back to the transceiver module 2.

For example, when the water-bottom depth is 50 m, 100 m, or 200 m, the transmitting pulse width may be set to 0.5 ms, 1 ms, or 2 ms, respectively. Further, when the water-bottom depth has a range of 70-90 m or 90-110 m, the transmitting pulse width may be set to 0.8 ms or 1 ms, respectively, to make it proportional to the water-bottom depth in a stepped manner. In other words, the transmitting pulse width may be precisely proportional to the water-bottom depth, or may generally be proportional to the water-bottom depth. Therefore, in this specification, the term "proportional" includes the both conditions.

When the transmission drive signal is supplied to the transducer 1 from the transceiver module 2 which received the transmitting pulse-width control signal, the pulse of the pulse width that is proportional to the water-bottom depth 1 is transmitted from the transducer. Thus, because the transmitting pulse width is proportional to the water-bottom depth, the water-bottom echo length W expressed by the equation (1) is also proportional to the water-bottom depth D.

The amplitude data extracting module 9 extracts amplitude data at a time interval that is proportional to the water-bottom depth, from predetermined amplitude data among a series of the amplitude data outputted from the detection module 5 (i.e., predetermined echo signals among the water-bottom echo signals).

In this embodiment, the series of the amplitude data is represented by a sequence of numbers constituted with two or more amplitude data arranged in a temporal order, that are obtained when transmitting a single pulse. Further, in this embodiment, the predetermined amplitude data may be set to 0.95 D-2.5 D (D is the calculated value of the water-bottom depth) based on distance. The start point is set to 0.95 D to include a standup section of a primary water-bottom echo signal in the extracting range. The end point may be set to 2.5 D to include a secondary water-bottom echo signal in the extracting range.

For the bottom-sediment classification of this embodiment, it is not essential to use the feature quantity calculated based on the secondary water-bottom echo signal. However, because an amplitude ratio of the primary water-bottom echo and the secondary water-bottom echo can be an index of reflectance of the water bottom surface, an accuracy of the classification may be improved by using the feature quantity as well. On the other hand, when not using the feature quantity for the classification, the predetermined echo signals may be set to 0.95 D-1.6 D.

Next, a method of extracting the amplitude data at a time interval that is proportional to the water-bottom depth will be explained. A data number at the front end of the extracting range (typically, the number is an integer indicative of an order of sampling) is a data number of the amplitude data to be sampled at a time corresponding to 0.95 D. Hereinafter, this data number is referred to as "start number." The number of data within the extracting range is the number of data to be sampled in the time period corresponding to 2.5 D-0.95 D.

Here, assuming that R, which is greater than or equal to "1", is proportional to the calculated value of the water-bottom depth and an integer part of a quotient of the number of data within the extracting range divided by R is N, the amplitude data of {start number+n·R} (n=0, 1, 2, . . . , N−1) will be extracted. Hereinafter, this R is referred to as a "data number interval." When {n·R} is not an integer, an interpolation of the amplitude data will be performed. In this embodiment, the time interval at which the amplitude data is extracted may be accurately proportional to the water-bottom depth, or may be generally proportional to the water-bottom depth in a stepped manner, as described above. Further, because the transmitting pulse width is proportional to the water-bottom depth, the amplitude data may be extracted at a time interval that is proportional to the transmitting pulse width, as well.

Figure 2A:
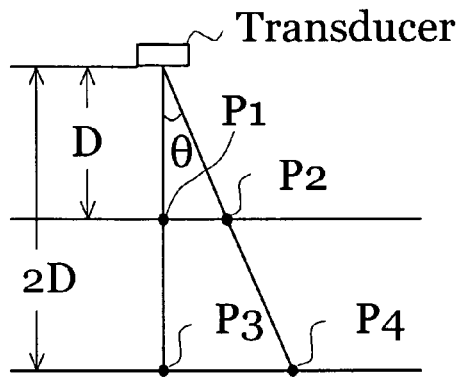
FIG. 2A shows a geometric relationship between a water-bottom depth and a pulse width that is proportional to the water-bottom depth.

Now, referring to FIG. 2A, effects obtained by transmitting the pulse of the pulse width that is proportional to the water-bottom depth will be explained. Assuming a half angle of a directivity angle of the ultrasonic wave transmitted from the transducer is θ. Further, assuming a water bottom position directly below the transducer when the water-bottom depth is D is P1, and a water bottom position pointed by the directivity angle is P2. Further, assuming a water bottom position directly below the transducer when the water-bottom depth is 2 D is P3, and a water bottom position pointed by the directivity angle is P4. For simplicity, an influence of propagation loss in the water is ignored, and only the water-bottom echo signals from P1 and P2, or P3 and P4 are considered.

Figure 2B:
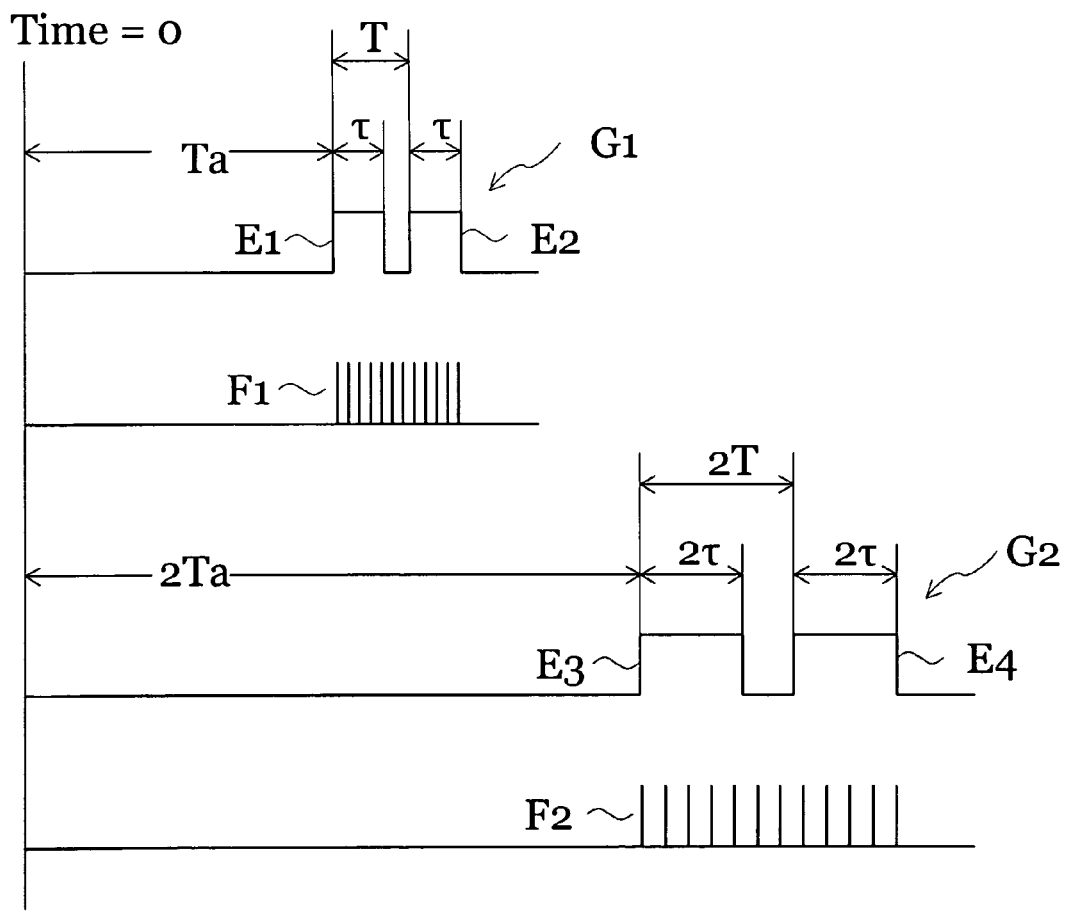
FIG. 2B is a timing chart for explaining effects obtained by the geometric relationship shown in FIG. 2A.

As shown in FIG. 2B, if a time difference between water-bottom echo signals E1 and E2 from the water bottom positions P1 and P2, respectively, is T, a time difference between water-bottom echo signals E3 and E4 from the water bottom positions P3 and P4, respectively, will be 2 T. Because the transmitting pulse width is proportional to the water-bottom depth in this embodiment, if a width of the water-bottom echo signals E1 and E2 is τ, a width of the water-bottom echo signals E3 and E4 will be 2τ. Therefore, widths T+τ and 2 T+2τ of combined signals G1 and G2 of the water-bottom echoes E1 and E2, and E3 and E4 from the water bottom positions P1 and P2, and P3 and P4 at different depths, respectively, are proportional to the water-bottom depth, and waveforms of two combined signals G1 and G2 are similar. In other words, if one combined waveform is compressed or expanded in directions of the time axis and the amplitude axis, they will be identical to each other. A ratio of both the time lengths is equal to a ratio of the water-bottom depths (in this case, the ratio is 2). Therefore, the numbers of the amplitude data F1 and F2 extracted from the combined signals G1 and G2, respectively, at a time interval that is proportional to the water-bottom depth are equal to each other. Further, the values of both the data are identical except for one of the values is a multiplied number of the other.

The gain compensation module 10 performs a TVG-process to the amplitude data extracted by the amplitude data-extracting module 9. By this TVG-process, an amount of attenuation of the received signal level resulting from the propagation loss of the ultrasonic signal can be rectified. In FIG. 1, although the gain compensation module 10 is arranged behind the amplitude data-extracting module 9 in the process sequence, it may also be arranged in front of the amplitude data extracting module 9.

The smoothing module 11 smoothes the gain-compensated amplitude data. More specifically, the amplitude data obtained at the two or more process cycles of the same frequency (50 kHz or 200 kHz) is averaged for each data number. The value to be outputted by the smoothing module 11 within {k}th process cycle is an average value of the amplitude data obtained for five process cycles from {k−4}th to {k}th, for example. Although the smoothing process is not essential for this embodiment, it can reduce a variation in the amplitude data value due to slight reeling of the ship, or noises and, thus, it improves reliability of the bottom-sediment classification.

The normalizing module 12 normalizes the smoothed amplitude data with their maximum value. A series of the normalized amplitude data is shown as a graph in FIG. 3. By normalizing the amplitude data, the bottom-sediment classification result will not be influenced by a variation of the receiving level due to aging of sensitivity of the transducer 1, air bubbles near the water surface, etc.

In this embodiment, the pulse of a pulse width that is proportional to the water-bottom depth is transmitted from the transducer 1, a series of amplitude data is extracted from the predetermined water-bottom echo signals at a time interval that is proportional to the water-bottom depth, the TVG-process is applied to the extracted amplitude data, and the amplitude data after the TVG-process is then normalized. As a result, if the bottom-sediment types are the same, the amplitude data after the normalization will be the same regardless of the water-bottom depth. Therefore, in this embodiment, because the feature quantity is compensated based on a value corresponding to the water-bottom depth, the bottom-sediment classification is not influenced by the water-bottom depth. In other words, if the bottom-sediment types are the same, the classification results will be the same even if the water-bottom depths differ.

Figure 3:
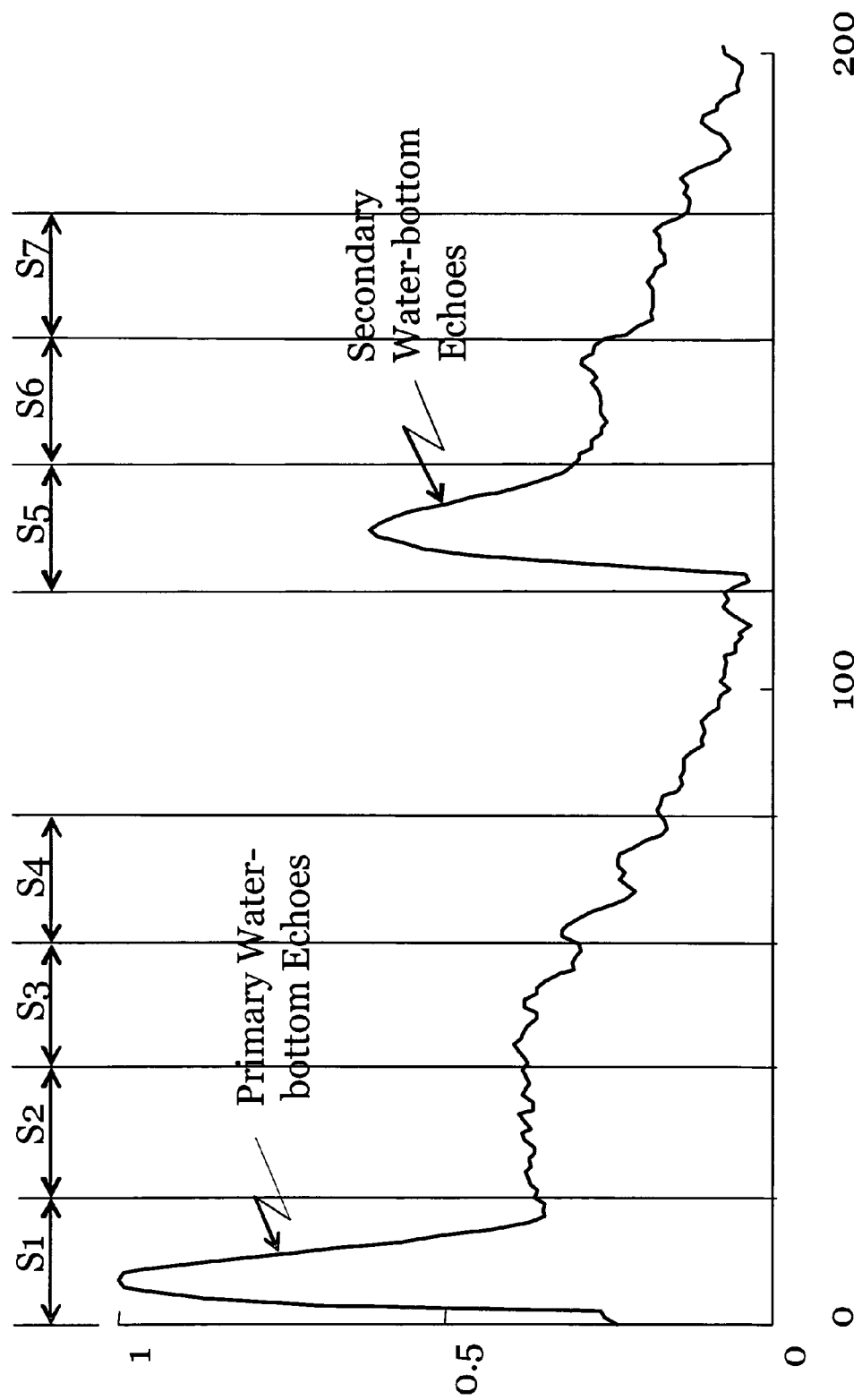
FIG. 3 is an echo chart showing normalized amplitude data and segments.

As shown in FIG. 3, the series of the normalized amplitude data is divided in seven segments S1–S7, and for each segment, the feature quantity calculating module 13 calculates a sum-total value of the series of normalized amplitude data (this is referred to as the "feature quantity"). The feature quantity is calculated for each process cycle (50 kHz and 200 kHz). In an example shown in FIG. 3, the number of segments is seven, and widths of the segments (i.e., number of the amplitude data in the segment) are all equal. In this embodiment, although the number of the amplitude data contained in each of the segments S1–S7 is set to approximately 20, the data number interval R or the sampling frequencies of the A/D conversion module 4 are determined to be so. Between the segments S4 and S5, because the value of amplitude data is small and tends to be influenced by noises, the feature quantity is not calculated for these segments.

In this embodiment, the feature quantity is calculated from each of the segments S3 and S4, which are away from the peak of the primary water-bottom echoes. This is because the primary water-bottom echo signals from a side-lobe direction of the transducer 1 are also used for the bottom-sediment classification. Further, in this embodiment, the feature quantity is calculated from each of the segments S5–S7 of the secondary water-bottom echo signals. This is because the information used as the index of reflectance of the water bottom surface is also used for the bottom-sediment classification.

Figure 4B:
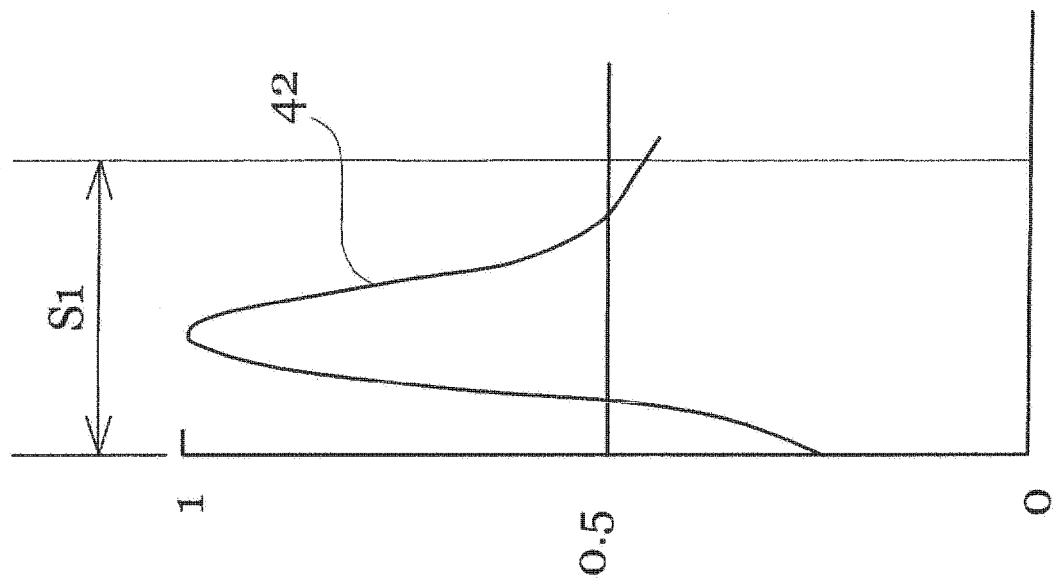
FIGS. 4A and 4B are two series of normalized amplitude data with their threshold values.
Figure 4A:
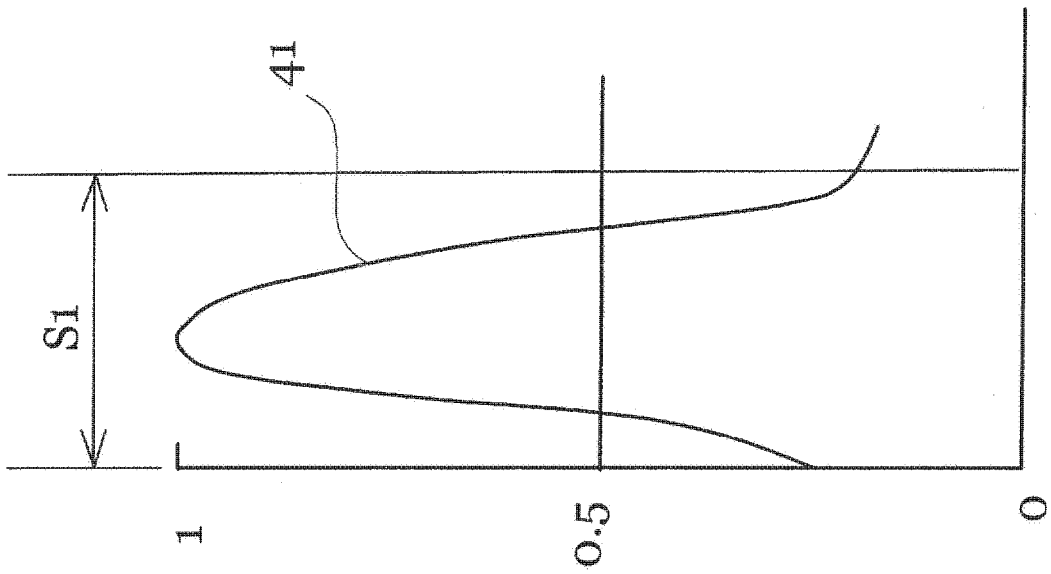

In this embodiment, for a segment with a large signal level, such as the segment S1, each value of the amplitude data that is greater than a predetermined threshold value (e.g., 0.5) among a series of the amplitude data in the segment is subtracted by the threshold value, and the subtracted values are sum-totaled, and the sum-totaled value is used as the feature quantity, as described above. For example, in graphs 41 and 42 of two series of amplitude data illustrated in FIGS. 4A and 4B, areas of the segments where the values are greater than 0 are equal, while areas of the segments where the values are greater than 0.5 are different from each other. Therefore, by using both the feature quantity calculated with the threshold value as 0 and the feature quantity calculated with the threshold value as 0.5, the amplitude data 41 and 42 can be distinguished, and thereby improving the bottom-sediment classification accuracy. Further, when the threshold value is set to a value greater than the amplitude data produced by the noises as described above, a negative influence to the bottom-sediment classification resulted from the noises may be reduced, and thereby improving the classification accuracy.

In the example of FIG. 3, the number of segments is seven, the segment widths are all equal, and the adjacent segments are not overlapped. However, without limiting to this, the number of segments may be varied, the segment widths may be unequal, and/or a portion of the segment may be overlapped. Further, it may be desirable to determine the optimal number of the segments and the segment widths in accordance with the directional characteristics or the transmitting pulse frequencies of the transducer 1. In this embodiment, although the amplitude data is extracted from a range including between the segments S4 and S5, the amplitude data may be extracted from a range corresponding to the segments S1–S4 and S5–S7.

Further, in this embodiment, the feature quantity is calculated by sum-totaling the amplitude data in each segment. However, the feature quantity may be calculated using a standard deviation of the amplitude data values in each segment, or using a moment value calculated from the amplitude data in each segment.

Next, a calculation method for the moment will be explained. Assuming number of the amplitude data in a certain segment is M, and a series of the amplitude data is x[n] (n=0, 1, 2, . . . , M−1). Weights w[n] can be calculated by dividing each amplitude data x[n] by the sum-totaled value S of the entire amplitude data. That is, w[n] can be calculated according to the following equation:

$$w[n] = \frac{x[n]}{S}, \quad S = \sum_{n=0}^{M-1} x[n].$$

Next, a center of gravity C of a series of the amplitude data x[n] can be calculated according to the following equation:

$$C = \sum_{n=0}^{M-1} n \cdot w[n].$$

A second moment $\mu_2$ can be calculated according to the following equation:

$$\mu_2 = \sum_{n=0}^{M-1} (n-C)^2 \cdot w[n].$$

A third moment $\mu_3$ can be calculated according to the following equation:

$$\mu_3 = \sum_{n=0}^{M-1} (n-C)^3 \cdot w[n].$$

The second moment $\mu_2$ is an index of a reach of the series of amplitude data in a segment in the time-axis direction. Further, a distortion g that can be defined by the following equation is an index indicating a degree and a direction of asymmetry in the time-axis direction for the same series of the amplitude data:

$$g = \frac{\mu_3}{\left(\sqrt{\mu_2}\right)^3}.$$

Therefore, the feature quantity can be calculated from the second moment or the distortion.

The neural network 14 is a hierarchical-type neural network, and generates the bottom-sediment classification information based on the feature quantity outputted from the feature quantity-calculating module 13. In this embodiment, a set of the feature quantities (referred to as, a "feature-quantity set") obtained through the process cycles (50 kHz and 200 kHz) are input variables for the neural network 14. Further, number of output variables is set to four in this example, and a set of synaptic connection coefficient is determined so that each output variable becomes a value indicating a similarity with a bottom-sediment type (i.e., rocks, stones, sands, or mud). The set of synaptic connection coefficient may be stored in the storage device of the calculation control module 17 in advance.

Next, a method of determining the set of synaptic connection coefficient will be explained. First, many feature-quantity sets are collected using the classification device 100 at each location where the water bottom sediment is rocks, stones, sands, or mud, respectively, while each of the bottom-sediment types is actually checked with an underwater camera, etc. Next, the set of synaptic connection coefficient may be determined using a personal computer with a back-propagation algorithm based on the collected feature-quantity sets and the checked bottom-sediment types. The set of synaptic connection coefficient is then stored in the storage device of the calculation control module 17.

In other words, the neural network 14 uses the set of synaptic connection coefficient (i.e., reference information) obtained from the feature quantity, the bottom-sediment type of which is known, calculated from the water-bottom echoes from the water bottom of each bottom-sediment type, and the known bottom-sediment type, and generates a numerical value indicating the similarity of the bottom-sediment (i.e., the bottom-sediment classification information) based on the feature quantity calculated from the water-bottom echoes from the water bottom for which the bottom sediment is determined. In this embodiment, the number of the output variables is not limited to four. Further, the bottom-sediment type corresponding to each output variable is not limited to rocks, stones, sands, or mud.

Figure 5:
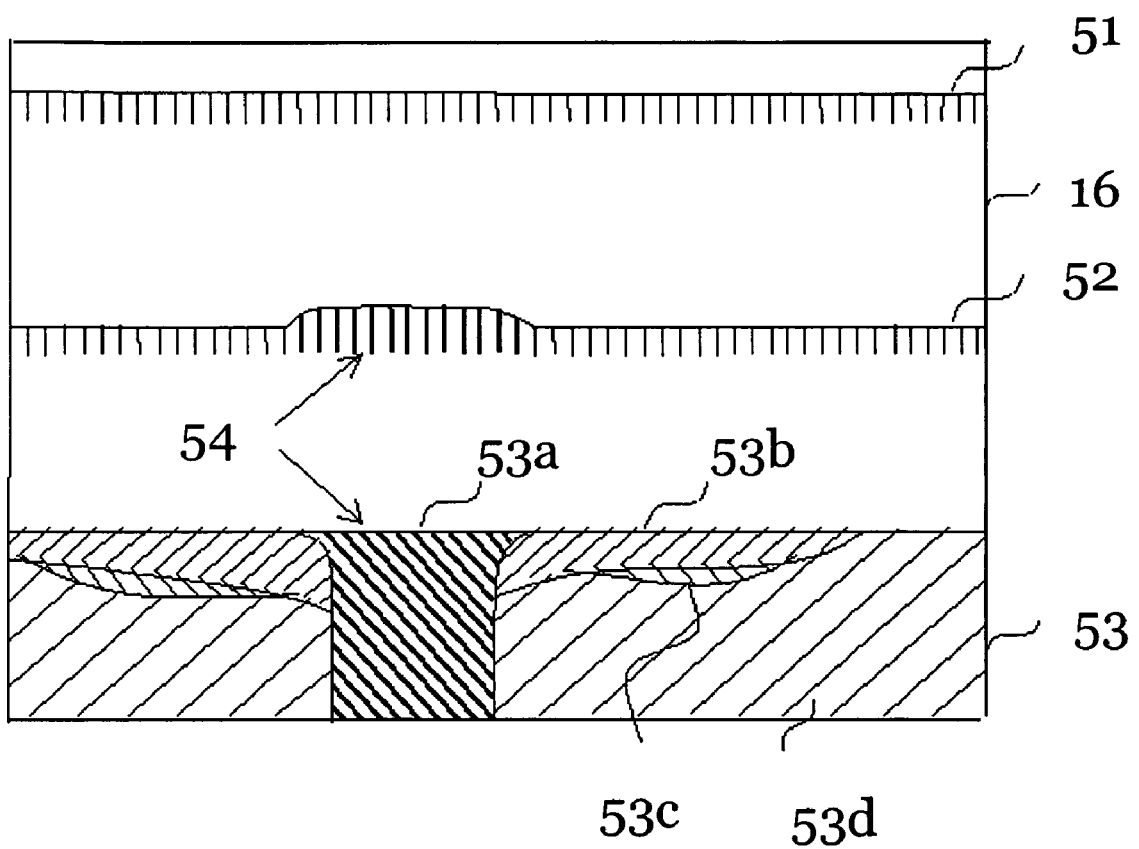
FIG. 5 is a display view of bottom-sediment classification information.
Figure 6:
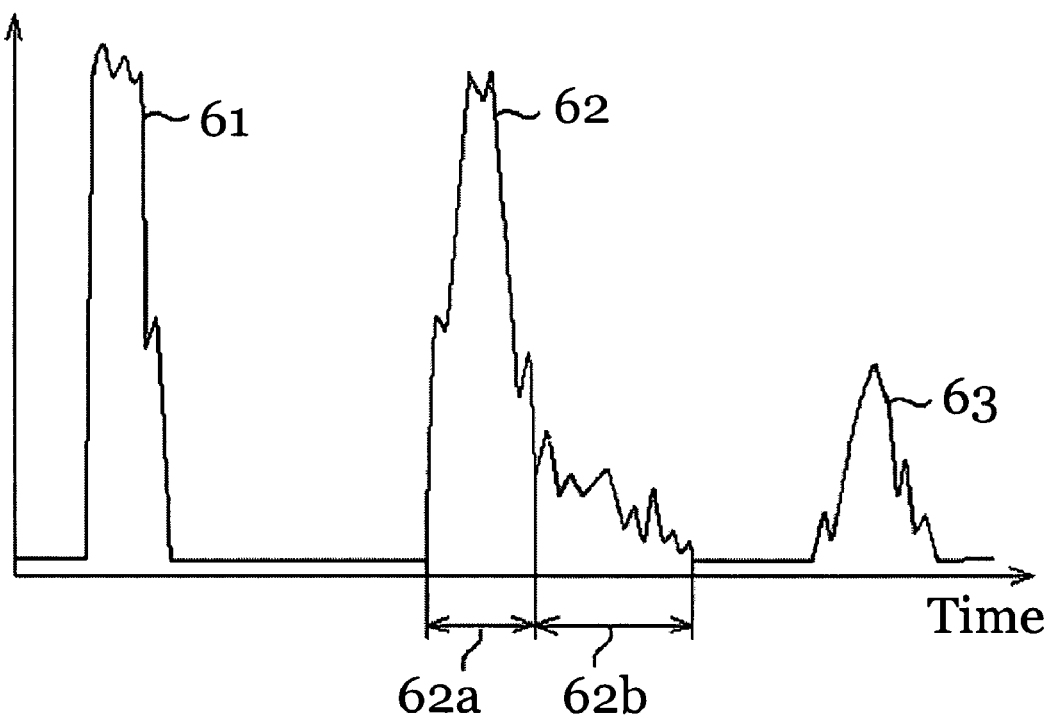
FIG. 6 is a graph showing water-bottom echoes in the conventional bottom-sediment classification.
Figure 7A:
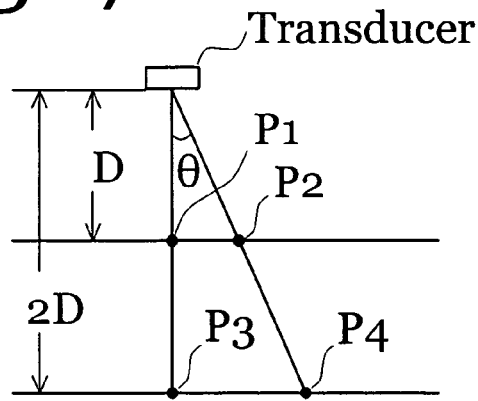
FIG. 7A shows a conventional geometric relationship between a water-bottom depth and a constant pulse width.
Figure 7B:
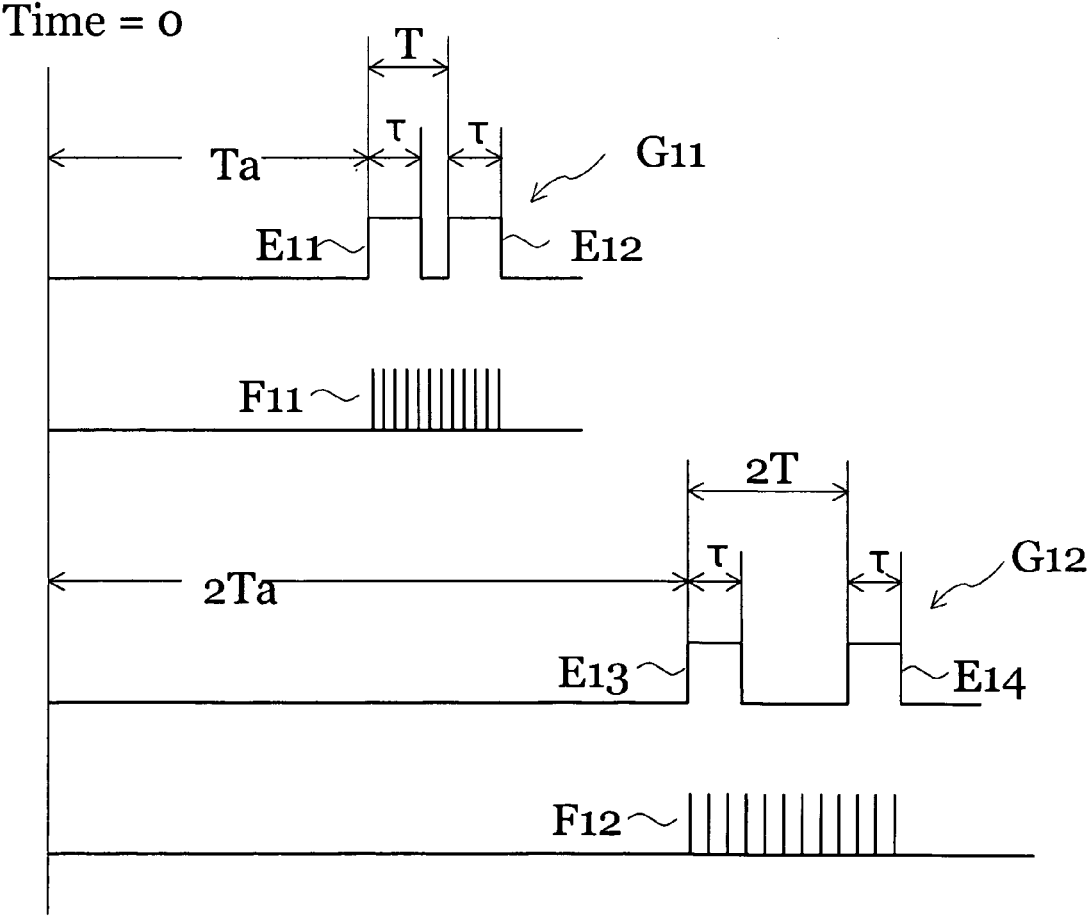
FIG. 7B is a timing chart for explaining effects obtained by the geometric relationship shown in FIG. 7A.

The display process module 15 converts the numerical values of the four output variables (i.e., the bottom-sediment classification information) into display data, and then displays them on the display module 16. FIG. 5 shows the display example of the bottom-sediment classification information. The screen image of the display module 16 shown in FIG. 5 is an image when passing over a sunken ship while determining bottom sediment. Arrow 54 shows a position of the sunken ship. An upper half of this screen image is the same image as what a typical fish finder displays. A reference numeral 51 indicates an image directly resulted from a transmission drive signal, and 52 indicates an image of the water bottom surface. A reference numeral 53 indicates an image of the bottom-sediment classification information, and it includes images 53a-53d, a thickness of each corresponds to a ratio of each numerical value with respect to the entire values (i.e., sum-totaled numerical values). The images 53a-53d are displayed with the thickness in the vertical direction to be distinguished from the others. The images 53a-53d may be distinguished by different colors, such as red, yellow, blue, and gray.

In this embodiment, thicknesses of the images 53a-53d each represents the similarity of the bottom sediment to be determined with respect to rocks, stones, sands, and mud, respectively. In this example, the sunken ship is projected from the water bottom surface constituting a rough surface and its surface is hard, similar to rocks. Corresponding to this, the image 53 of the classification information shows that the similarity between the sunken ship and rocks is high.

As such, because the image 53 of the classification information displays information indicating the similarities of the bottom sediment of the water bottom to be determined in the bottom-sediment types with respect to rocks, stones, and the like, the bottom sediment and its variation is apparent without necessity of actually checking the bottom sediment with an underwater camera, etc. In this embodiment, if only the bottom-sediment type with the highest similarity is necessary, only the bottom-sediment type concerned may be displayed without displaying the other types.

In this embodiment, by extracting the amplitude data at a time interval that is proportional to the water-bottom depth, the feature quantity is calculated without depending on the water-bottom depth. However, the feature quantity without depending on the water-bottom depth may also be calculated using that the time length of the water-bottom echo signal is proportional to the water-bottom depth, as follows.

First, the amplitude data extracting module 9 extracts the amplitude data not at a time interval that is proportional to the water-bottom depth but at a fixed time interval. Then, the feature quantity calculating module 13 calculates a sum total of the amplitude data in each of the segments S1-S7, then divides each sum-total value by a value that is proportional to the water-bottom depth to calculate two or more feature quantities independent of the water-bottom depth. As such, the feature quantity that is not directly dependent on the water-bottom depth can be obtained by using a value corresponding to the water-bottom depth, more specifically, a value that is proportional to the water-bottom depth.

Further, although an example of determining the bottom sediment using the transmission pulse of two different frequencies in this embodiment has been explained, the frequencies of the transmission pulse may be one frequency, or three or more frequencies. Because the directivity of the ultrasonic wave varies with frequency, if the transmission pulse of two or more different frequencies is used, independent information regarding the bottom sediment can be acquired for each frequency. Thus, two or more different frequencies are preferable for accuracy of the bottom-sediment classification.

Further, although the transmission pulses of 50 kHz and 200 kHz are alternatively transmitted from a single transducer 1 in this embodiment, two transducers for 50 kHz and 200 kHz of different directivity may also be used. In this case, two types of band path filters to separate the receiving signal into 50 kHz and 200 kHz may be provided to the transceiver module, and doing so, the feature quantity in each frequency can be simultaneously calculated by two separate receiving circuits (i.e., the A/D conversion module, amplitude data extracting module, etc.).

Generally, because the amplitude of the water-bottom echo signal is greater as the water-bottom depth is less, there is a possibility that the received signal may be saturated when the water-bottom depth is too small. Therefore, it is desirable to control the transceiver module 2 according to the calculated water-bottom depth value so that the transmitting power of the echo signal decreases in a shallow-water area (for example, less than 10 m). Alternatively, an existence of saturation may be determined from the received signal (for example, the output signal of the detection module 5), and when the saturation exists, the transmitting power may be lowered. As such, the disadvantage due to the saturation of the received signal can be reduced when the bottom-sediment classification is performed in the shallow-water area.

Further, in this embodiment, noise in the received signal is removed by the band restrictions with the transceiver module 2. In addition, if a digital filter is provided between the A/D conversion module 4 and the detection module 5, and a filter coefficient is changed so that a receiving bandwidth is narrower in a deep-water area where the transmitting pulse width is greater, a signal-to-noise ratio of the received signal will be higher, and thereby further improving the bottom-sediment classification accuracy.

Further, the feature quantity is calculated from the normalized amplitude data in this embodiment. However, the amplitude data after the normalization may be log-transformed, and the feature quantity may then be calculated from the log-transformed amplitude data. As such, information on the bottom sediment contained in extremely small amplitude data, such as the water-bottom echoes resulting from the side lobe of the transducer 1, secondary water-bottom echoes, or the like can be more effectively utilized, and thereby further improving the bottom-sediment classification accuracy.

Further, as the water-bottom depth is less, the water-bottom echo signals are more easily saturated because the propagation loss is smaller. Further, as the water-bottom depth is less, the water-bottom echo signals are more easily influenced by the frequency characteristic of the transducer because the transmitting pulse width is smaller. Therefore, instead of the above-described configuration of this embodiment where a single set of synaptic connection coefficient is applied to the neural network 14 regardless of the water-bottom depth, the configuration may be altered as follows.

For example, if the set of synaptic connection coefficients that are adapted to a shallow-water area (e.g., a water-bottom depth is less than 10 m) and a deep-water area, respectively, are stored in the storage device of the calculation control module 17, and one of the set of synaptic connection coefficients to be applied to the neural network 14 can be selected according to the calculated value of the transmitting pulse width or the water-bottom depth, it is possible to obtain a good bottom-sediment classification performance over a wide water-depth range. The set of synaptic connection coefficients for the shallow-water area and the deep-water area can be obtained using the feature quantity obtained in these areas, as described above.

At a boundary area between the shallow-water area and the deep-water area, two of the bottom-sediment classification information may be generated by individually applying the set of synaptic connection coefficients for the shallow-water area and the deep-water area to the same feature-quantity set. Then, using these (for example, by the linear combination of both), the bottom-sediment classification information for display may be generated. By configuring as above, disadvantages from which the bottom-sediment classification results discontinuously changes near the boundary will not occur.

In this embodiment, it may also be possible to provide three or more sets of synaptic connection coefficients corresponding to the water-bottom depth, and select one of the set of the synaptic connection coefficients corresponding to the water-bottom depth. Alternatively, it may be possible to change the number of segments, the segment width (see FIG. 3), or the threshold value of the amplitude data (see FIG. 4) according to the transmitting pulse width or the water-bottom depth calculated value.

Alternatively, although the transmission pulse is a sine wave signal in this embodiment, it may be a frequency modulation signal or a phase modulation signal, such as a linear FM signal (i.e., a signal whose frequency increases or decreases with a constant speed). In this case, it may be possible to suppress a variation of the amplitude of the water-bottom echo signal resulting from the propagation distance difference between countless reflective waves reflected from the water bottom surface to which a pulse is transmitted, and it may be possible to stabilize the maximum amplitude data to be used for the normalization. Therefore, a stability of the bottom-sediment classification results further improves.

Further, in this embodiment, the transmission pulses of a pulse width that is proportional to the water-bottom depth is transmitted. However, transmission pulses of a frequency modulation signal or a phase modulation signal that has a bandwidth that is inversely proportional to the water-bottom depth may be transmitted, while a matched filter adapted to these transmission pulses may also be applicable to the water-bottom echo signals. The matched filter may be arranged between the A/D conversion module 4 and the detection module 5. For example, when the water-bottom depth is 50 m, 100 m, and 200 m, bandwidths of the transmission pulses may be 2 kHz, 1 kHz, and 0.5 kHz, respectively. Alternatively, when the water-bottom depth is 70 m-90 m and 90 m-110 m, it may be possible for the bandwidth of the transmission pulse to be inversely proportional to the water-bottom depth in a stepped manner, such as 1.25 kHz and 1 kHz, respectively. In other words, the bandwidth of the transmission pulse may be exactly inversely proportional to the water-bottom depth, or may generally be inversely proportional to the water-bottom depth.

As such, similar to the case where the transmission pulse of a pulse width that is proportional to the water-bottom depth is transmitted, the water bottom sediment may be determined without being influenced by the water-bottom depth. In addition, it may be possible to control the variation of the amplitude of the water-bottom echo signal resulting from the propagation distance difference of countless reflective waves reflected from the water bottom surface of the transmission pulse. In addition, by having the pulse width of the transmission pulse to be longer, the signal-to-noise ratio in the matched filter output increases, and the reliability of the bottom-sediment classification results further improves.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A bottom-sediment classification device for transmitting a pulse of an ultrasonic wave from a transducer to a water bottom, and determining bottom sediment of the water bottom based on water-bottom echo signals received by the transducer, the device comprising:
    a transmitting module configured to transmit the pulse of the ultrasonic wave, the pulse having a pulse width corresponding to a water-bottom depth;
    an extracting module configured to extract a series of amplitude data of the water-bottom echo signals from predetermined echo signals among the received water-bottom echo signals at a predetermined time interval;
    a normalizing module configured to normalize the series of amplitude data extracted by the extracting module
    a gain compensation module configured to TVG-process the extracted series of amplitude data;
    a feature quantity calculating module configured to calculate two or more feature quantities based on the normalized series of amplitude data in each of segments of the normalized series of amplitude data, and a value corresponding to the water-bottom depth;
    and
    a generating module configured to generate bottom-sediment classification information indicating the bottom sediment based on the two or more feature quantities.

2. The bottom-sediment classification device of claim 1, wherein the extracting module calculates the two or more feature quantities by extracting the series of amplitude data at a time interval that is proportional to the water-bottom depth.

3. The bottom-sediment classification device of claim 1, wherein the feature quantity calculating module obtains the two or more feature quantities from the series of amplitude data in each of the segments using a value that is proportional to the water-bottom depth.

4. The bottom-sediment classification device of claim 1, wherein the predetermined echo signals includes primary water-bottom echo signals and secondary water-bottom echo signals.

5. The bottom-sediment classification device of claim 1, wherein the feature quantity calculating module calculates the two or more feature quantities by subtracting a threshold from amplitude data that is greater than the threshold value among the series of amplitude data in each of the segments.

6. The bottom-sediment classification device of claim 1, wherein the transmitting module transmits a first pulse and a second pulse of different frequencies or directivities;
    wherein the feature quantity calculating module calculates the two or more feature quantities for the first and second pulses, respectively; and
    wherein the generating module generates the bottom-sediment classification information based on the two or more feature quantities for the first and second pulses.

7. The bottom-sediment classification device of claim 1, wherein the generating module generates the bottom-sediment classification information based on the two or more feature quantities calculated from the water-bottom echo signals using reference information, the reference information being obtained from the two or more feature quantities calculated from the water-bottom echo signals from a water bottom of each bottom-sediment type, a bottom-sediment type of which is known, and the known bottom-sediment type.

8. The bottom-sediment classification device of claim 7, wherein the reference information is obtained from the water-bottom echo signals in a shallow-water area and a deep-water area for each bottom-sediment type; and
    wherein the generating module generates the bottom-sediment classification information selectively using one of the reference information for the shallow-water area or the deep-water area corresponding to the water-bottom depth.

9. The bottom-sediment classification device of claim 1, wherein the bottom-sediment classification information includes numerical values indicating similarities between the bottom sediment to be determined and two or more known bottom-sediment types, information indicative of a ratio of each of the numerical values over a sum-totaled value of all the numerical values being displayed.

10. The bottom-sediment classification device of claim 1, wherein the pulse to be transmitted is a frequency modulation signal or a phase modulation signal.

11. The bottom-sediment classification device of claim 1, wherein the transmitting module transmits a pulse of a frequency modulation signal or a phase modulation signal having a bandwidth that is inversely proportional to the water-bottom depth, and wherein a matched filter adapted to the pulse is applied to the water-bottom echo signals received by the transducer.

12. A bottom-sediment classification method of transmitting a pulse of an ultrasonic wave from a transducer to a water bottom, and determining bottom sediment of the water bottom based on water-bottom echo signals received by the transducer, the method comprising:
    transmitting the pulse of the ultrasonic wave, the pulse having a pulse width corresponding to a water-bottom depth;
    extracting a series of amplitude data of the water-bottom echo signals from predetermined echo signals among of the water-bottom echo signals received by the transducer at a predetermined time interval;
    TVG-processing the extracted series of amplitude data;
    normalizing the extracted series of amplitude data;
    calculating two or more feature quantities based on the normalized series of amplitude data in each of segments of the normalized series of amplitude data, and a value corresponding to the water-bottom depth; and
    generating bottom-sediment classification information indicating the bottom sediment based on the two or more feature quantities.

13. A bottom-sediment classification device for transmitting a pulse of an ultrasonic wave from a transducer to a water bottom, and determining bottom sediment of the water bottom based on water-bottom echo signals received by the transducer, the device comprising:
    an extracting module configured to extract a series of amplitude data of primary water-bottom echo signals and secondary water-bottom echo signals at a predetermined time interval from predetermined echo signals containing a peak of the primary water-bottom echo signals and a peak of the secondary water-bottom echo signals, respectively;

a gain compensation module configured to TVG-process the extracted series of amplitude data a normalizing module configured to normalize the extracted series of amplitude data;

a feature quantity calculating module configured to calculate two or more feature quantities of the primary water-bottom echo signals and two or more feature quantities of the secondary water-bottom echo signals based on the normalized series of amplitude data in each of segments of the normalized series of amplitude data; and a generating module configured to generate bottom-sediment classification information indicating the bottom sediment based on the two or more feature quantities.

14. The bottom-sediment classification device of claim 1, wherein the gain compensation module TVG-processes the extracted series of amplitude data before the normalizing module normalizes the extracted series of amplitude data.

15. The bottom-sediment classification device of claim 13, wherein the gain compensation module TVG-processes the extracted series of amplitude data before the normalizing module normalizes the extracted series of amplitude data.

16. The bottom-sediment classification method of claim 12, wherein the step of TVG-processing is performed before the step of normalizing.

* * * * *